Aug. 16, 1927.
C. S. BRAGG ET AL
1,639,284
STEERING MECHANISM FOR AUTOMOTIVE VEHICLES
Filed Nov. 1, 1924　　3 Sheets-Sheet 1
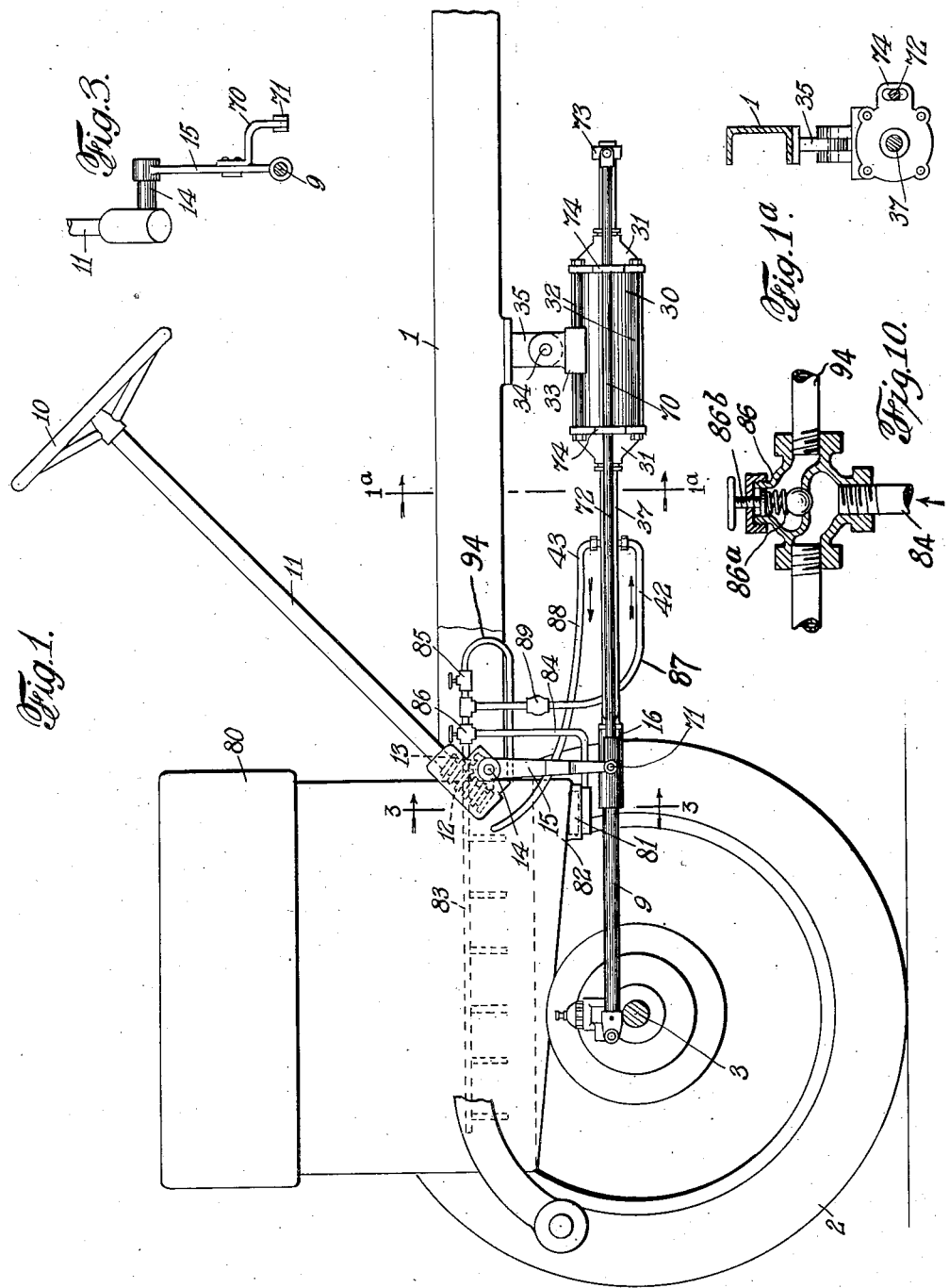
INVENTORS
Caleb S. Bragg
Victor W. Kliesrath
BY
Louis Russell Whitaker
ATTORNEY

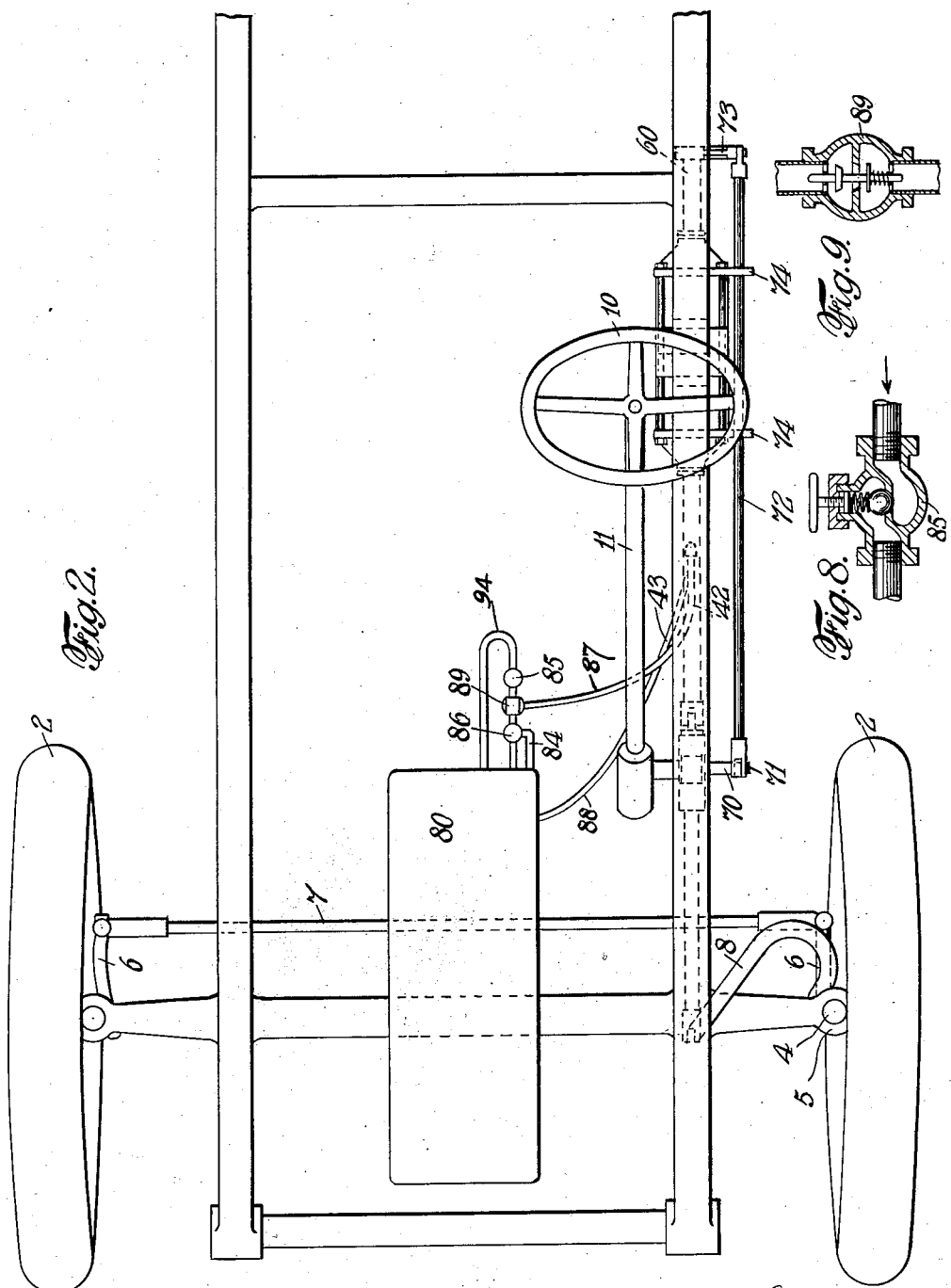

Aug. 16, 1927.
C. S. BRAGG ET AL
1,639,284
STEERING MECHANISM FOR AUTOMOTIVE VEHICLES
Filed Nov. 1, 1924
3 Sheets-Sheet 3
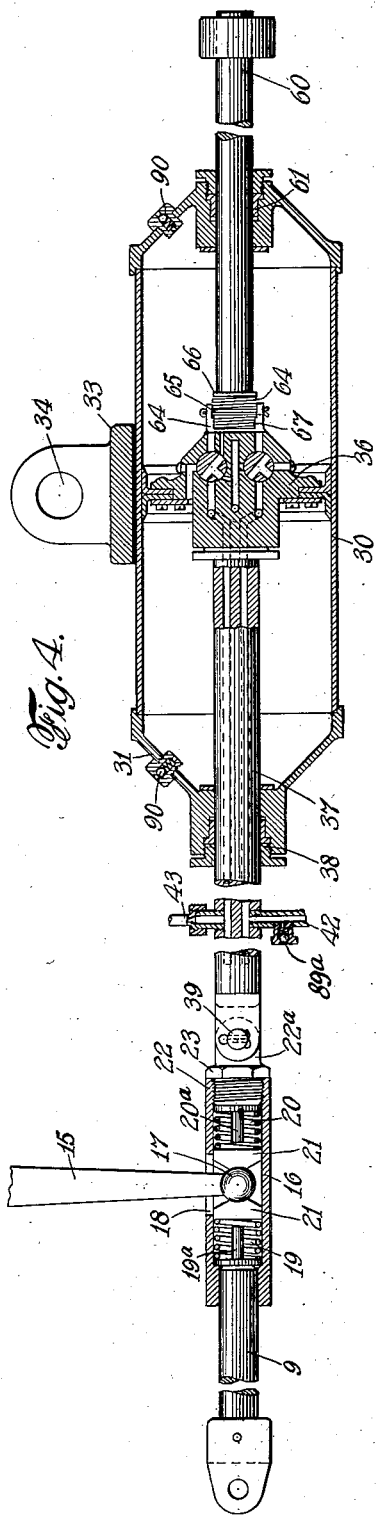
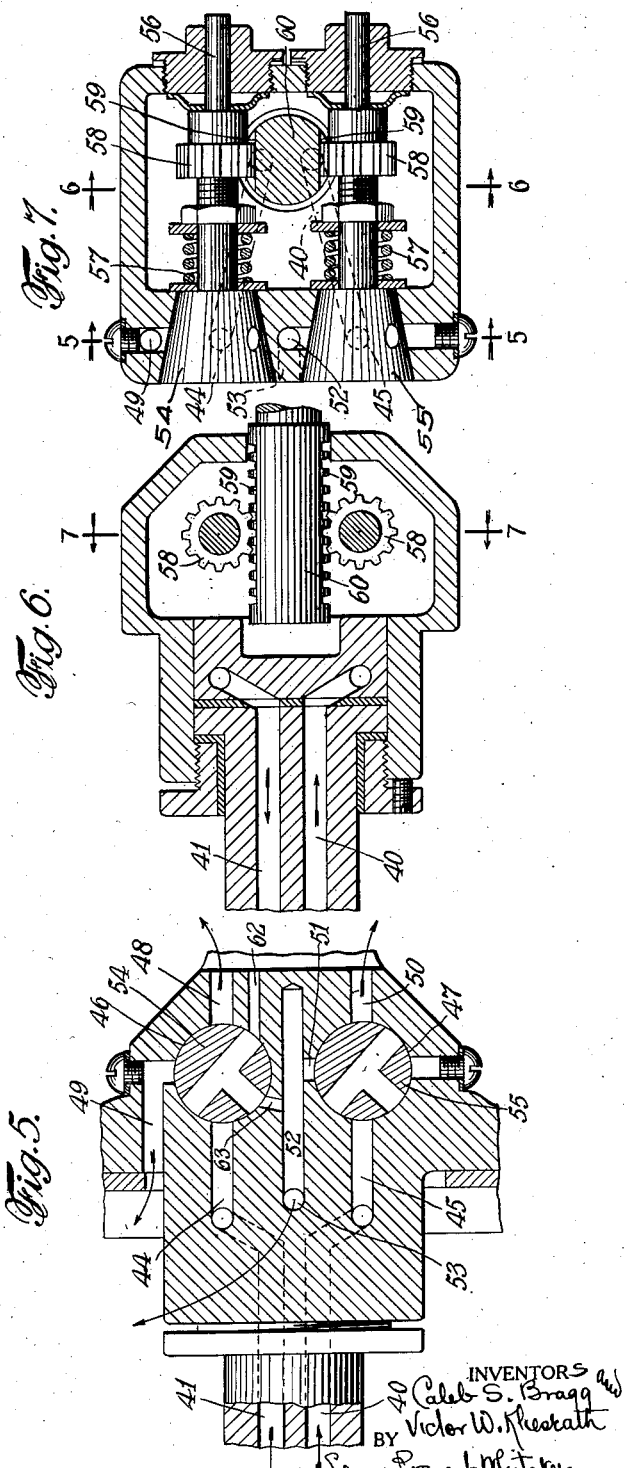
INVENTORS
Caleb S. Bragg
Victor W. Kliesrath
BY
Louis Prevost Whitaker
ATTORNEY Patented Aug. 16, 1927.

1,639,284

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

STEERING MECHANISM FOR AUTOMOTIVE VEHICLES.

Application filed November 1, 1924. Serial No. 747,271.

Our invention consists in the novel features hereinafter described, reference being had to the accompanying drawings which illustrate one embodiment of the invention selected by us for purposes of illustration, and the said invention is fully disclosed in the following description and claims.

In the operation of automotive vehicles of the heavier types, such as large and powerful passenger cars, motor buses, and the like, and motor trucks, the vehicles are steered ordinarily by turning the front wheels simultaneously by means of a hand operated wheel controlled by the driver. When the vehicle is passing over a hard smooth roadway and proceeding in a substantially straight direction, the operation of this steering wheel or other manually controlled device does not ordinarily require the exertion of any considerable physical force on the part of the driver or chauffeur, but in making turns and sudden swerves, especially at slow speed, as in city traffic, the operation of such manually operated devices calls for the exertion of much greater force, even on substantially smooth roads, which produces exhaustion after continuous driving, as in the case of city buses, trucks, etc. In the operation of the vehicle on the rutty or soft roads, or when as very frequently happens, the outer wheels of the vehicle are necessarily turned on to lateral portions of a roadway, which are rutty or soft, a very great amount of force is required for operating the steering mechanism correctly, and it not infrequently happens, especially where the vehicles are being operated at comparatively high speed, that the operator is unable to control the steering mechanism, owing to inexperience or exhaustion, so that more or less serious accidents may and frequently do result.

The object of our invention is to provide, in connection with the ordinary steering mechanism of such automotive vehicles, or any automotive vehicles in which its use may be found advantageous or desirable, a power actuator for positively actuating the steering mechanism of the vehicle under the positive and delicate control of the operator through ordinary steering wheel or other manually operated device, the said actuator being so connected with the steering mechanism of the vehicle that the latter may be directly and entirely operated by the manually operated mechanism when the conditions are such as to require but a small amount of the physical power of the driver to effect the movement of the steering mechanism, or resist road shocks while the power of the actuator will be instantly called into operative effect to assist the physical force exerted by the operator and to relieve him to a greater or less extent from the labor of operating the steering mechanism whenever steering conditions become hard or whenever a great amount of power is required to be applied to the steering mechanism. Our invention also provides means whereby, in case of the failure of the actuator to furnish all the necessary power required to effect a steering movement of the steering mechanism, the physical force exerted by the operator may be added to that exerted by the actuator, and whereby, upon the partial or entire failure of the actuator for any reason, the steering mechanism can nevertheless be controlled and operated through the manually operated control mechanism in the usual manner.

For the purpose of providing the necessary power for the power actuator, we prefer to employ a motor liquid or pressure liquid such as oil, for example, supplied from a suitable source under pressure by means of a pump. Practically all motors employed in the type of vehicles above referred to are internal combustion engines, and are provided with a forced feed lubricating system including an oil pump, which pumps the oil continually under a comparatively high pressure, substantially thirty pounds or upwards, through circulating pipes to the various bearings of the engine from which the oil finds its way back to a sump or reservoir and is used over and over again. In order to maintain an adequate supply of oil under pressure for lubricating the various bearings, under all conditions of the oil, which becomes thin when heated or from use (crank case dilution) and under all conditions of the bearing surfaces, which, when worn, permit a greater amount of oil to pass through them, it is customary to provide a pump of far greater capacity than normally needed, and to insert in the pressure line from the pump, a by-pass leading back to the sump or reservoir and containing a regulating valve, which will open when the predetermined pressure in the circulating lubricating system is obtained, and by-pass the excess oil pumped, back to the reservoir or sump. In carrying our invention into effect, we draw upon the forced feed lubricating system of the engine as a source of power for operating our power actuator. As the operation of the actuator is intermittent, and its action and operation extend through very short periods of time, an extremely small quantity of pressure liquid is required to operate it, as compared with the capacity of the pump, and we have ascertained by practical demonstration that the actuator can be operated in carrying out our invention, by means of oil under pressure from the lubricating system of an ordinary automobile engine without in any way interfering with the operation of the lubricating system or reducing the pressure or the quantity of oil delivered to the motor bearings to such an extent as to in any way impair the proper lubricating action on the engine. In carrying our invention into effect, we prefer to connect the pressure pipe line leading to the actuator, to the by-pass of the engine lubricating system so that as a matter of fact, the oil which is actually used in the operation of the actuator is excess oil beyond the normal requirements of the lubricating system, and does not impair its efficiency. In the specific embodiment of our invention herein shown and described, we have gone further for the purpose of preventing possible injury to the engine, and to this end we prefer to employ in the by-pass of the lubricating system of the engine, an adjustable pressure regulating valve which we term a safety valve which is set to open at a predetermined pressure below which it would be undesirable to operate the engine, and a second pressure regulating valve is also provided between the safety valve and the oil reservoir, which is set at the normal pressure usually maintained in such oil circulating systems, the pipe line to the actuator being tapped into the by-pass between said valves. From this construction it follows that so long as the oil circulating system is working properly, there will ordinarily be ample pressure available for the operation of the actuator without in any way diminishing the supply of oil to the engine. In case of complete failure of the oil circulating system, so that there is no pressure of oil to operate the actuator, the steering mechanism can, as before stated, be operated by hand, but with the necessity of the exertion of much greater force on the part of the driver or operator, who would thus be instantly warned that the actuator was not functioning and that an examination of the oil reservoir, and lubricating system is necessary to prevent injury to the engine which would result by running it with insufficient lubrication. However, in case of partial failure of the lubricating system so as not to wholly destroy the oil pressure in the lubricating system, and such pressure remained at or fell below that for which the safety valve in the by-pass was set, no pressure would be available for, and no oil would be used by, the actuator, and no damage could be done to the motor through the use of the actuator, but the driver's attention would immediately be called to this condition. Obviously, in case of a break in the pressure line leading to the actuator, which would result in a failure of the actuator to operate, the driver would also be immediately apprised of this fact in the same manner, and would at once take steps to make the necessary repairs.

Our invention also contemplates the employment of a normally open spring actuated valve in the pressure line leading from the by-pass of the oil circulating system to the actuator, constructed to remain open and permit the passage of oil under normal conditions, but effective to instantly close in case of a break in the pressure line leading to the actuator, which would reduce pressure on one side of the valve and permit it to be instantly closed against its spring by the pressure of oil from the circulating system, thereby preventing loss of oil pending the making of the necessary repairs.

We prefer to employ a power actuator comprising a cylinder, a double acting piston working therein, and valve mechanism for admitting the pressure fluid to either end of the cylinder, that is to say, on either side of the piston, said valve mechanism being so constructed that when it is in neutral position, the pressure fluid is cut off from both ends of the cylinder, and at the same time a communicating by-pass or passage is established which will permit the oil to flow from one side of the piston to the other preferably through the piston, to enable the steering mechanism to be operated manually without the aid of or interference from the actuator when the valve mechanism is in neutral position. We further provide means for normally maintaining the valve mechanism in neutral position and for automatically returning it to neutral position after it has been moved out of neutral position in either direction, so that if for any reason the valve operating mechanism should become broken, there would be no danger of an improper actuation of the steering mechanism by the actuator. Our invention also provides air vents to prevent the formation of partial vacuum on the pressure side of the piston when the valves are in operative position to cause the movement of the piston, and for any reason, such as the stalling of the motor, the oil pressure fails.

Our invention also comprises other novel features hereinafter particularly pointed out in the following description and claims.

Referring to the accompanying drawings, which illustrate one embodiment of our invention, selected by us for purposes of illustration, Fig. 1 represents a side elevation of a portion of an automobile chassis showing the engine (diagrammatically represented) the front wheels, the steering mechanism therefor, and having our invention embodied therein.

Fig. 1$^a$ represents a vertical sectional view on the line 1$^a$—1$^a$ of Fig. 1.

Fig. 2 is a top plan view of the parts illustrated in Fig. 1.

Fig. 3 is a detail sectional view on line 3—3 of Fig. 1.

Fig. 4 is an enlarged sectional view illustrating one form of our improved power actuator and its connections, with the steering mechanism and manually operated control mechanism therefor.

Fig. 5 is an enlarged sectional view through a portion of the actuator piston and reversing valve mechanism, the line of section being indicated by the line 5—5 of Fig. 7.

Fig. 6 is an enlarged sectional detail view showing the means for actuating the reversing valve mechanism of the actuator on line 6—6 of Fig. 7.

Fig. 7 is another sectional view through the valve mechanism, on the line 7—7 of Fig. 6.

Figs. 8, 9 and 10 are detail views of valves which we prefer to use in connection with the fluid pressure line.

In the accompanying drawings, 1, represents the chassis of an automotive vehicle which may be of any usual or desired construction, and is provided with steering wheels, indicated at 2—2. In connection with these steering wheels we have shown the ordinary manner of mounting and connecting the same for joint actuation, although it is to be understood that our invention is applicable to any form of steering mechanism. In the present instance the wheels are mounted on stub axles, 3, having vertical pivotal portions, 4, forming with their bearings, 5, the usual steering knuckles, each axle being provided with a steering arm, 6, and said arms being connected by an equalizing rod, 7, in the usual manner. One of the axles is provided with the usual steering lever, 8, to which the usual drag link, 9, is connected in any usual or preferred manner. For the purpose of securing the manual control of the steering mechanism, either with or without the assistance of the actuator, hereinafter described, we have shown the usual steering wheel, 10, secured to the upper end of a steering shaft, 11, provided on its lower end with a worm, 12, engaging the usual worm segment, 13, on a horizontal shaft, 14, provided with a downwardly extending arm, 15, which is connected with the drag link and the piston of the power actuator directly, and is also connected as hereinafter explained, with the reversing valve mechanism of the actuator in such manner that the steering mechanism can be operated either with or without the assistance of the actuator by turning the steering wheel, 10. To this end, the rear end of the drag link, 9, is provided with a sleeve, 16, adapted to accommodate a hardened ball, 17, at the lower end of the arm, 15. The upper side of the sleeve, 16, is provided with a slot, 18, through which the arm, 15, passes, so as to accommodate a slight movement of the arm, 15, with respect to the sleeve. Within the sleeve, 16, we provide a pair of springs, 19—20, located on opposite sides of the ball, 17, and engaging hardened wear-plates, 21—21, having recessed surfaces to engage the ball, 17. At the rear end of the sleeve, 16, is provided adjusting means in the form of a screw plug, 22, which is screwed into the sleeve so as to compress both of the springs, 19—20, to the same extent and hold the wear plates, 21, firmly in contact with the ball, 17.

When there is no physical power applied to the steering wheel or other manually operated device, these springs, 19 and 20, are sufficiently strong to maintain the valve mechanism of the actuator, in neutral position with respect to the piston. These springs may be so designed that when compressed to their full extent, they form stops to prevent further movement of the valve actuating mechanism with respect to the piston, and thus prevent injury to the valve mechanism. We prefer to provide each of said springs with a washer provided with a stop (19$^a$, 20$^a$, respectively) to engage the adjacent wear plate and limit the movement of the drag link actuating arm with respect to the sleeve to a predetermined amount, sufficient to the full opening of the valve mechanism in either direction. and preventing the valve mechanism from being strained or injured by physical force applied to the steering wheel. The plug, 22, is held in adjusted position by a lock nut, 23. From the description of the parts thus far given, it will be seen that when the hand wheel, 10, is turned in one direction or the other, the arm, 15, will be moved either forwardly or rearwardly, as the case may be, and that if the resistance of the steering mechanism is not sufficient to cause the compression of the springs, 19 or 20, (according to the direction in which the arm, 15, moves) the steering mechanism will operate under the manual control of the operator exactly as any ordinary steering mechanism operates.

30 represents the actuator cylinder which is supported from the chassis in rear of the arm, 15, and drag link, 9, connected therewith, the cylinder being provided with heads, 31, connected by suitable bolts, 32. In order to permit the piston rod of the actuator to be connected directly to the drag link in alignment with the axis of its pivotal connection with the arm, 15, and to avoid the use of universal joints in valve actuating rod, we prefer to mount the cylinder of the actuator pivotally with respect to the chassis to accommodate the slight variations in the position of the piston rod, to accommodate the arc of travel of the ball, 17, and to this end the cylinder is provided with a heavy supporting hinge casting, 33, connected by a hinge pin, 34, with a hinge member, 35, secured to the chassis, 1, which permits the cylinder to oscillate, as required. 36 represents the actuator piston which is double acting, and is preferably provided with oppositely extending gaskets, as shown. 37 represents the piston rod, which extends through a stuffing box, 38, at the forward end of the actuator cylinder, and has its forward end connected with the sleeve, 16. In this instance the plug, 22, is provided with an extension, 22ª, to which the forward end of the piston rod is positively connected by a pin, 39. By reason of this construction it will be observed that the power of the actuator, when in use, is applied to the drag link in exact alignment with the point at which the power of the hand operated lever, 15, applies power to the drag link.

The actuator piston is provided with a reversing valve mechanism for controlling the admission and eduction of oil, and in this instance we have shown a reversing valve mechanism including rotatable valves. The particular form of valve mechanism herein shown and described is not specifically claimed herein as it forms the subject matter of a separate application for Letters Patent of the United States, filed by us November 6, 1924, and given Serial No. 748,293. As shown in the drawings, the piston rod is provided with an inlet passage, 40, and an outlet passage, 41, which passages may be formed by drilling the piston rod longitudinally to provide parallel longitudinal passages therein, as shown, and the piston rod is also provided outside of the cylinder with lateral apertures communicating respectively with the passages, 40 and 41, to which are connected respectively pressure inlet pipe, 42, and the outlet pipe, 43. The central portion of the piston is provided with a passage, 44, and with a parallel passage, 45, said passages forming continuations respectively of the passages 41 and 40 in the piston rod. In line with each of the passages, 44, and 45, is a conical valve seat, 46 and 47, respectively. The valve seat, 46, is provided with an outlet port, 48, opening on the rear side of the piston, and with an outlet port, 49, opening on the opposite or forward side of the piston. The valve seat, 47, is provided with an inlet port, 50, communicating with the cylinder in rear of the piston, and an inlet port, 51, communicating with the cylinder forward of the piston by means of a longitudinal passage, 52, and a transverse or angular passage, indicated at 53. In the conical valve seats are located rotary three-way valves, indicated at 54 and 55 respectively, each of which is provided with a valve stem, 56, suitably mounted in the piston and provided with coil springs, 57, for holding the valves in their conical seats. Each of the valve stems is provided with a pinion, 58, for rotating it, said pinions meshing with racks, 59, on opposite sides of a valve actuating rod, 60, which extends through the rear head of the actuator cylinder, through a stuffing box, 61, therein, for actuating the rotary valves by longitudinal movement of the rod, 60.

In Fig. 5. the rotary valves are shown in section in their neutral positions, in which it will be noted that the outlet passage, 44, is not in communication with either of the outlet ports, 48 and 49, and the inlet passage, 45, is not in communication with either of the inlet ports, 50 or 51. Obviously when the valve is in this position, the actuator is inoperative. In order that the steering mechanism may be operated by hand at all times when the reversing valves are in neutral position, we provide means for establishing a passage through the piston from one side to the other, so that the oil may pass from one end of the cylinder through the piston to the other end of the cylinder, to accommodate movements of the steering mechanism by hand. To this end we have shown herein the valve seat, 46, provided with auxiliary ports, 62 and 63, the former communicating with the cylinder at the rear of the piston, and the latter communicating with the cylinder forward of the piston through the passages, 52, 53, said ports being so located as to be brought into direct communication through the three-way passage in the valve, 54, when the latter is in its neutral or normal position, as clearly shown in Fig. 5. These auxiliary ports may be made of considerable cross sectional area, so as to allow the oil to pass through very freely, in which case the actuator piston would offer very slight resistance when the reversing valves are in neutral position and the steering mechanism is operated by hand. If it is desired to have the piston of the actuator provide a retarding effect on the actuation of the steering mechanism by hand, and also to act to a certain extent as a dash-pot or shock absorber, to prevent accidental or sudden movements of the steering mechanism. as might occur if one of the steering wheels struck a large stone or obstruction, or dropped into a deep hole or soft portion of the road, the cross sectional area of the auxiliary ports, 62 and 63, can be reduced to any extent which may be found desirable. Obviously the smaller the cross sectional area of these passages, the greater will be the effect of the piston in retarding the hand operated movements of the steering wheels, and the greater will be its effect as a dash-pot, or shock absorber.

We also prefer to provide means for normally holding the reversing valves in their neutral positions so that the valves will be returned to neutral position after each actuation and will be normally held therein in case of the breaking of the valve actuating means hereinafter described. In the present instance, we have shown the valve actuating rod, 60, provided with a pair of coil springs, 64, arranged on opposite sides of a collar, 65, secured to the piston and between said collar and shoulders, 66—67 on the valve actuating rod, 60, so that whenever the rod, 60, is moved longitudinally so as to actuate the rotary valves, one or the other of these springs will be compressed and will tend to return the rod and valves to neutral position. Any other suitable mechanism for this purpose may be employed.

Referring now to Figs. 5, 6, and 7. it will be understood that if the valve rod, 60, is moved forward or to the left, the valve, 54, will be rotated clockwise, so as to bring the outlet passage, 44, into communication with the outlet port, 49, and close the auxiliary ports, 62 and 63. At the same time the rotary valve, 55, will be moved counter-clockwise, so as to bring the port, 50, into communication with the inlet passage, 45. The pressure liquid will immediately pass into the cylinder in rear of the piston and cause the piston to move forward, the liquid in the cylinder forward of the piston being forced out through the passage, 41, and returned to the sump, as hereinafter explained. The movement of the piston will, therefore, follow the movement of the actuating rod. As soon as the actuating rod stops the continued movement of the piston will cause it to move relatively with respect to the rod, 60, and restore the valves to neutral position. If the rod, 60, is moved rearwardly or to the right, the valve, 54, will be rotated counter-clockwise, so as to connect the outlet port, 48, with the passage, 44, while the valve, 55, will be rotated clockwise so as to connect the inlet port, 51, with the inlet passage, 45, thereby admitting pressure liquid to the cylinder forward of the piston and discharging liquid from the cylinder in rear of the piston and causing the piston to travel backward until the rearward movement of the rod, 60, ceases, when the continued movement of the piston, with respect to the rod, restores the valves to normal position, and re-establishes the through passage, 62—63.

In order to effect the longitudinal movement of the valve actuating rod, 60, we provide the drag link operating lever, 15, with a lateral arm, 70, see Fig. 3, the lower end of which is pivotally connected at 71, with a link bar, 72, extending to the rear end of the valve actuating rod, 60, where it is pivotally connected to the bracket arm, 73, secured to the rod, 60. We prefer to provide the cylinder with suitable slotted guides, indicated at 74, through which this link rod passes, in order that the rod may be prevented from falling to the ground and improperly operating the actuator in case it should become disconnected from the arm 70. For convenience in attaching the actuator to existing steering mechanism, the arm, 70, may be in the form of a bracket arm and may be secured to the ordinary worm actuated lever, 15, as indicated in Fig. 3. Obviously, it may be made in one piece with the arm, 15, if desired, and in either case the axis of the pivotal connection, 71, should be in line with the center of the ball, 17, at the lower end of the arm, 15.

Referring now to the sleeve, 16, and the oppositely arranged springs, 19 and 20, therein, on opposite sides of the ball, 17, it will be understood that when the hand wheel, 10, is turned, if the resistance offered by the steering wheels and connected mechanism is so slight that the said wheels respond without compressing either of the springs, 19 or 20, as the case may be, according to the direction in which the wheel is turned, it is obvious that the piston of the actuator, the valves of which are in neutral position, will simply move in the cylinder displacing a small quantity of oil from one side of the piston to the other, and the rod, 60, will move with the piston without altering its position longitudinally with respect thereto. Consequently, the valves will remain in neutral position and the wheels will be steered by hand power without bringing the actuator into operation at all save as it may exert a slight retarding influence and serve as a dash-pot to a greater or less extent, according to the cross sectional area of the through-passage, provided by ports, 62—63. If, however, the resistance to the turning movement of the wheels is sufficiently great, as turning slowly and in passing over rutty or uneven ground or soft ground, so that the wheels do not instantly respond to the physical force exerted by the operator on the steering wheel, one of the springs, 19—20, as the case may be, will be compressed by the movement of the arm, 15, thus producing a movement of the valve actuating rod, 60, with respect to the piston, and when this relative movement is sufficient to rotate the valves into either of their operative positions, the piston will instantly respond and proceed to move under the force of the pressure fluid, moving the piston rod and the drag link in the same direction as the physical force exerted by the driver would tend to move it. The power of the actuator is, therefore, immediately added to the force exerted by the driver or operator, to effect the steering movements desired or resist road shocks and relieve him from further muscular exertion. As soon as the piston has moved far enough to effect the desired steering movement, there will be no load on the springs, 19—20, and the springs will restore the valve to neutral position, as heretofore described. If, for any reason the power of the actuator alone should be insufficient to effect the steering movement desired, the physical force of the driver will be added to the power of the actuator in effecting the desired movement.

Our invention, therefore, provides a very flexible and readily controlled steering arrangement which can be very readily attached to the normal steering mechanism of automotive vehicles of any kind without making any radical changes therein, and by the use of which the operator can exercise the fullest control of the steering wheels, operating them by manual power only, under conditions which oppose only a slight resistance to his steering movements of the hand wheel or other manually operated device, and instantly applying the power of the actuator whenever the resistance to a steering movement becomes sufficient to cause the compression of the springs, 19—20, to such an extent as to actuate the reversing valve mechanism, and again restoring the apparatus to neutral position upon the completion of each steering movement.

As before stated, the pressure fluid, preferably a liquid as oil, required for the operation of the actuator, may be provided from any suitable source, by means of a suitable pressure pump operated from the engine, but as before stated, we prefer to employ the force feed oil system of the ordinary automotive internal combustion engine as the source of power for the operation of the actuator, when called into use. In the accompanying drawings, for example, we have indicated more or less diagrammatically, the motor or engine, at 80, which may be of any ordinary type, preferably an internal combustion engine provided with the usual force feed lubricating system. This system comprises a pump, 81, which pumps the lubricating oil from a reservoir or sump, indicated at 82, in the bottom of the crank case through a pipe, 84, or pipes, which supply the oil under pressure to the bearings and other parts of the engine or motor, as indicated in dotted lines, at 83, in Fig. 1. 94, represents a by-pass leading from the pipe, 84, back to the lower portion of the crank case and discharging surplus oil, above the requirements of the circulating system to the oil reservoir or sump. 86 represents a relief valve, which we term the safety relief valve, which is inserted before the pipe, 84, and the by-pass, 94. This valve is preferably an adjustable spring actuated ball relief valve, shown in detail in Fig. 10, the ball valve being held closed by a spring, 86ª, the tension of which may be adjusted, as by a screw threaded hand operated device, 86ᵇ, for example. A second adjustable relief valve, 85, is preferably arranged in the by-pass, 94, as shown, between the safety relief valve, 86, and the oil reservoir or sump. This relief valve, 85, is shown in detail in Fig. 8, and likewise is provided with the ball valve having an adjustable spring tension normally holding it in closed position. In practice, we prefer to set the safety relief valve, 86, at a minimum pressure, below which it would not be considered safe to operate the engine, and to set the relief valve, 85, to the maximum pressure which is ordinarily desired to be maintained in the circulating lubricating system. We arrange to take the pressure oil for operating the power actuator from the by-pass between the relief valves, 85 and 86, as indicated in Fig. 1, in which the pressure supply pipe, 42, is so connected and extends to the passage, 40, in the piston rod, 37.

In order to accommodate the longitudinal movements of the piston rod, it is necessary to insert a flexible section of pipe, indicated at 87, in the pipe, 42, as shown in Fig. 1. The outlet pipe, 43, from the piston rod is connected to the sump or oil reservoir, and is likewise provided with an intermediate flexible portion, 88. It follows from this construction that the pressure in the by-pass, 94, between the valves, 85 and 86, will normally be the maximum pressure maintained in the circulating system, and this is available for the operation of the actuator. As the operation thereof is intermittent, and extends through extremely short periods, only a little oil is withdrawn momentarily from the circulating system to operate the actuator, and by this arrangement the oil which is so withdrawn is excess oil beyond the normal requirements of the circulating lubricating system. As before stated, in case of complete failure of the circulating system, there would be no pressure of oil to operate the actuator, and the steering mechanism in such case can be operated by hand, but will require greater force on the part of the driver or operator. This would instantly warn the driver or operator that the actuator was not functioning and that an examination of the lubricating system would be necessary to avoid injury to the engine. If there is a partial failure only of the lubricating system, so that the pressure in the system falls to or below the pressure for which the safety valve, 86, is set, there would be no pressure available for the actuator and the actuator would not withdraw any oil from the lubricating system, so that there would be no danger of injury to the motor by the attempted use of the actuator. In such case, also, the driver's attention would be called to the condition of the oil circulating system by the failure of the actuator to properly function. We also prefer to provide an additional valve, 89, in the pressure fluid pipe, 42, leading to the actuator, which is of the well known type of normally open spring actuated valve as shown in Fig. 9, for example in which the valve is held open by a spring so long as pressures are substantially equal on opposite sides of the valve. This valve will be so arranged as to be instantly closed against its spring in case the connection of the pipe, 42, with the actuator should break or leak, thereby shutting off power fluid to the actuator and preventing it from being wasted. If such accident should occur, this would also result in putting the actuator out of operation, but the steering mechanism may nevertheless be operated by hand in the usual manner and the failure of the actuator would be immediately communicated to the driver by the increased amount of power which it would be necessary for him to exert in steering, so that he would have an opportunity to at once ascertain the nature and extent of damage and make the necessary repairs.

In carrying out our invention, we have provided not only a construction which is operable at the will of the operator under any and all conditions, when there is variable pressure to operate the actuator, but also a construction in which means are provided for preventing any improper operation of the actuator in case of accident, and also for preventing the actuator from in any way interfering with the manual operation of the steering mechanism in case the actuator itself becomes incapacitated. For example, if the steering wheel were being operated under conditions sufficiently strenuous to compress one of the springs, 19—20, and set the reversing valves for movement in one direction, and should the supply of motor fluid under pressure fail, as by breaking of the pump or stalling of the engine, the operator could effect the continued movement of the steering mechanism by means of the hand operated mechanism, but as the through passage, or by-pass, of the piston would be closed, the movement of the actuator would force a certain quantity of oil out of the cylinder into the sump, or reservoir, without material resistance, but on the other side of the piston, the oil would not be supplied readily and a partial vacuum might be caused, which would interfere with the ready operation of the steering mechanism by hand under such circumstances. In order to obviate the possibility of the formation of a partial vacuum within the cylinder under such conditions, or any other conditions, we prefer to provide means for venting inwardly both ends of the cylinder. This can be effected in several ways, of which two are illustrated in the accompanying drawings. For instance, the venting means can be applied to the inlet and outlet pipes, 42 and 43 by providing the pipe, 42 with an ordinary check valve, such as a ball check valve 89ª, indicated in Fig. 4 adapted to open inwardly. The pipe, 43, is preferably connected to the crank case or casing of the engine above the level of the oil therein, as indicated in Fig. 1, so that this vents the pipe, 43, and prevents the formation of a partial vacuum therein. We prefer, however, out of abundant caution, to provide each end of the cylinder with a check valve, such as a ball check valve, as indicated at 90—90, in Fig. 4, for example, so that under the circumstances above referred to, air will enter either end of the cylinder in case there is any danger of forming a partial vacuum, so as not to interfere with the manual operation of the steering mechanism when the reversing valve is in one of its operative positions. Any air so admitted would be expelled in the normal operation of the actuator and if air should accumulate at any time in the cylinder it can be released by operating the actuator and temporarily opening the auxiliary air valves, 90, until oil is ejected therefrom, but this will not be ordinarily necessary.

We do not claim herein the arrangement shown and described by which the power actuator is operated from the oil circulating system of the internal combustion engine, as this forms the subject matter of a divisional application filed by us on the third day of March, 1926, and given Serial No. 92,089.

What we claim and desire to secure by Letters Patent is:—

1. In an automotive vehicle, the combination with the steering wheels and steering mechanism therefor, and manually operated control mechanism for said steering mechanism, of oppositely disposed yielding devices interposed between the manually operated control mechanism and the steering mechanism and permitting the steering mechanism to be operated by physical force applied to said manually operated control mechanism without materially compressing said yielding devices under conditions imposing comparatively slight resistance to the steering movements of the wheels, a double acting power actuator operatively connected with said steering mechanism, means for supplying pressure fluid for operating said actuator, a reversing valve mechanism for said actuator, and operative connections from the valve mechanism to the manually operated control mechanism adapted to be brought into operation to effect the operation of the steering mechanism by the actuator when said yielding devices are compressed to a predetermined extent.

2. In an automotive vehicle, the combination with the steering wheels, steering mechanism including a drag link for operating both of said wheels, and manually operated control mechanism connected with said drag link of a power actuator comprising a cylinder and double acting piston therein, a connection from said piston to the drag link, means for supplying pressure fluid to said actuator cylinder, reversing valve mechanism for the actuator, oppositely disposed springs interposed between said manually operated control mechanism and said drag link and piston connection, and a connection from said manually operated control mechanism to said reversing valve mechanism adapted to be brought into operation when either of said springs is compressed to a predetermined extent.

3. In an automotive vehicle, the combination with the steering wheels, of steering mechanism therefor, including a drag link, manually operated control mechanism including an operating lever for the drag link, of a power actuator comprising a cylinder and a double acting piston therein, connections from said piston to the drag link, including a sleeve into which said operating lever extends, springs in said sleeve on opposite sides of said lever interposed between the drag link and piston connection, and adapted to permit the manually operated control mechanism to move the drag link and piston by physical power without materially compressing said springs when the resistance to the steering movements of the steering wheels is comparatively slight, means for supplying pressure fluid to the actuator cylinder, reversing valve mechanism, and operative connections between said drag link operating lever and said reversing valve mechanism adapted to be brought into operation when either of said springs is compressed to a predetermined extent.

4. In an automotive vehicle, the combination with the steering wheels, steering mechanism therefor, including a drag link, a manually operated control mechanism including a drag link operating lever, of a power actuator comprising a cylinder, a double acting piston therein, and operative connections from said piston to the drag link, oppositely disposed springs interposed between the drag link operating lever and the drag link and piston connection, means for supplying pressure liquid for operating said actuator, reversing valve mechanism for the actuator having provision for establishing a through passage connecting the ends of the cylinder on opposite sides of the piston when the valve mechanism is in neutral position, and operative connections between the drag link operating lever and said reversing valve mechanism adapted to be brought into operation when either of said springs is compressed to a predetermined point 5. In an automotive vehicle, the combination with the steering wheels, steering mechanism therefor, including a drag link, a manually operated control mechanism including a drag link operating lever, of a power actuator comprising a cylinder, a double acting piston therein, and operative connections from said piston to the drag link, oppositely disposed springs interposed between the drag link operating lever and the drag link and piston connections, means for supplying pressure liquid for operating said actuator, reversing valve mechanism for the actuator having provision for establishing a through passage connecting the ends of the cylinder on opposite sides of the piston when the valve mechanism is in neutral position, and operative connections between the drag link operating lever and said reversing valve mechanism adapted to be brought into operation when either of said springs is compressed to a predetermined point, said through passage being restricted to enable the actuator piston to serve as a dash pot to prevent sudden movements of the steering mechanism by the steering wheels, without interfering with the normal operation of the steering mechanism by the manually operated control mechanism, when said reversing valves are in neutral position.

6. In an automotive vehicle, the combination with the steering wheels, steering mechanism therefor including a drag link, manually operated control mechanism including an operating lever for the drag link, of a power actuator comprising a cylinder and double acting piston therein, connections from said piston to the drag link, oppositely disposed springs interposed between the drag link operating lever and the drag link and piston connection, pivotal supporting means for the actuator cylinder, means for supplying pressure fluid to the actuator cylinder, reversing valve mechanism for the actuator, and operative connections from the drag link operating lever to said reversing valve mechanism.

7. In an automobile vehicle, the combination with the steering wheels, steering mechanism therefor including a drag link, and manually operated control mechanism including an operating lever for the drag link, of a power actuator comprising a cylinder and double acting piston therein, connections from said piston to the drag link, oppositely disposed springs interposed between the drag link operating lever and the drag link and piston connection, pivotal supporting means for the actuator cylinder, means for supplying pressure fluid to the actuator cylinder, reversing valve mechanism for the actuator, and operative connections from the drag link operating lever to said reversing valve mechanism, and auxiliary supporting means for said connections having slotted portions.

8. In an automotive vehicle, the combination with the steering wheels, steering mechanism therefor, including a drag link, and manually operated control mechanism including a drag link operating lever, of a power actuator comprising a cylinder and double acting piston therein, a connection from the piston to the drag link, oppositely arranged springs between the drag link operating lever and the drag link, and piston connection, means for supplying liquid under pressure to the actuator, reversing valve mechanism for the actuator having provision for establishing a through passage from one end of the cylinder to the other on opposite sides of the piston when the valves are in neutral position, operative connections between the drag link operating lever and said reversing valve mechanism, and yielding means holding the reversing valve mechanism in neutral position and normally tending to return it to neutral position.

9. In an automotive vehicle, the combination with the steering wheels, steering mechanism therefor, including a drag link, and manually operated control mechanism including a drag link operating lever, of a power actuator comprising a cylinder and double acting piston therein, a connection from the piston to the drag link, oppositely arranged springs between the drag link operating lever and the drag link, and piston connection, means for supplying liquid under pressure to the actuator, reversing valve mechanism for the actuator having provision for establishing a through passage from one end of the cylinder to the other on opposite sides of the piston when the valves are in neutral position, operative connections between the drag link operating lever and said reversing valve mechanism, and oppositely disposed springs interposed between a part secured to said connections and a part secured to the piston for normally holding said reversing valves in neutral position.

10. In an automotive vehicle, the combination with steering wheels, steering mechanism therefor, and manually operated control mechanism for said steering mechanism, a double acting power actuator comprising a cylinder and a piston operatively connected with said steering mechanism, oppositely disposed springs interposed between the manually operated control mechanism, the steering mechanism and the actuator, permitting the steering mechanism to be operated by physical force without materially compressing said springs under conditions of slight resistance to steering movements, a reversing valve mechanism for said actuator, operative connections from the valve mechanism to the manually operated control mechanism, adapted to be brought into operation to effect the operation of the steering mechanism by the actuator when said springs are compressed, means for supplying a pressure fluid to the actuator cylinder, means for establishing a by pass from one end of the cylinder to the other when the reversing valves are in neutral position, and means for venting each end of the cylinder to prevent the formation of a partial vacuum therein in case of failure of the power fluid.

11. In an automotive vehicle, the combination with steering wheels, steering mechanism therefor, and manually operated control mechanism for said steering mechanism, a double acting power actuator comprising a cylinder and a piston operatively connected with said steering mechanism, oppositely disposed springs interposed between the manually operated control mechanism, the steering mechanism and the actuator, permitting the steering mechanism to be operated by physical force without materially compressing said springs under conditions of slight resistance to steering movements, a reversing valve mechanism for said actuator, operative connections from the valve mechanism to the manually operated control mechanism, adapted to be brought into operation to effect the operation of the steering mechanism by the actuator when said springs are compressed, means for supplying a pressure fluid to the actuator cylinder, means for establishing a by pass from one end of the cylinder to the other when the reversing valves are in neutral position, and an inwardly opening check valve connected with the cylinder on each side of the piston for preventing the formation of a partial vacuum in case of failure of the motor fluid.

12. In an automotive vehicle provided with an internal combustion engine and a force feed lubricating system therefor, including a pump and oil circulating passage connected therewith, steering wheels and steering mechanism therefor, and manually operated control mechanism for said steering mechanism, of a power actuator comprising a cylinder, a double acting piston therein, and reversing valve mechanism, a piston rod connecting said piston with the steering mechanism, of oppositely disposed yielding devices interposed between the manually operated control mechanism and the steering mechanism and piston rod of the actuator, and connections from a pressure lubricating passage of the engine to said reversing valve mechanism for the actuator, for supplying pressure liquid for operating the actuator, and operative connections extending from the manually operated control mechanism to said reversing valve mechanism adapted to be brought into operation to effect the operation of the steering mechanism by the actuator when said springs are compressed to a predetermined extent.

13. In an automotive vehicle, the combination with steering wheels, steering mechanism therefor, and manually operated. control mechanism for said steering mechanism, of pivotally disposed yielding devices interposed between the manually operated control mechanism and the steering mechanism, a double acting power actuator operatively connected with said steering mechanism, means for supplying pressure fluid for operating said actuator, a reversing valve mechanism for said actuator, operative connections from the valve mechanism to the manually operated control mechanism adapted to be brought into operation to effect the operation of the steering mechanism by the actuator when said yielding devices are compressed to a predetermined extent and whereby the valve mechanism will be normally returned to neutral position by said yielding devices, of stops for limiting the extent to which said yielding devices can be compressed to protect said valve mechanisms 14. In an automotive vehicle, the combination with the steering wheels, of steering mechanism therefor, including a drag link, manually operated control mechanism including an operating lever for the drag link, of a power actuator comprising a cylinder and a double acting piston therein, connections from said piston to the drag link, including a sleeve into which said operating lever extends, springs in said sleeve on opposite sides of said lever interposed between the drag link and piston connection, and adapted to permit the manually operated control mechanism to move the drag link and piston by physical power without materially compressing said springs when the resistance to the steering movements of the steering wheels is comparatively slight, means for supplying pressure fluid to the actuator cylinder, reversing valve mechanism, and operative connections between said drag link operating lever and said reversing valve. mechanism adapted to be brought into operation when either of said springs is compressed to a predetermined extent, and stops interposed between each of said springs and the drag link and piston connection respectively, for limiting the extent of movement of said reversing valve mechanism and preventing injury thereto.

15. In an automotive vehicle provided with an internal combustion engine, and a force feed lubricating system therefor, including a pump and oil circulating passages connected therewith, of a power actuator including a cylinder and a piston working therein, an actuated part connected with the piston, and reversing valve mechanism, and operative connections from said oil circulating system to said reversing valve mechanism for supplying pressure fluid for the operation of said actuator, a manually operated control device requiring the continuous and sensible control by the operator, connections therefrom to the actuated part providing for lost motion, and connections from the manually operated control device to the valve mechanism constructed without provision for lost motion, whereby the operator will be made aware of the partial or total failure of the lubricating system.

In testimony whereof we affix our signatures.

CALEB S. BRAGG.
VICTOR W. KLIESRATH.